United States Patent
Toshioka et al.

(10) Patent No.: US 9,140,164 B2
(45) Date of Patent: Sep. 22, 2015

(54) EXHAUST GAS PURIFICATION DEVICE FOR INTERNAL COMBUSTION ENGINE

(71) Applicant: KABUSHIKI KAISHA TOYOTA JIDOSHOKKI, Kariya-shi, Aichi-ken (JP)

(72) Inventors: Shunsuke Toshioka, Susono (JP); Koichiro Fukuda, Numazu (JP); Shigeki Nakayama, Gotenba (JP); Noriyoshi Takahashi, Kariya (JP); Atsushi Kidokoro, Kariya (JP); Sakutaro Hoshi, Kariya (JP); Satoshi Watanabe, Kariya (JP)

(73) Assignees: KABUSHIKI KAISHA TOYOTA JIDOSHOKKI, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/360,809

(22) PCT Filed: Nov. 21, 2012

(86) PCT No.: PCT/JP2012/080184
§ 371 (c)(1),
(2) Date: May 27, 2014

(87) PCT Pub. No.: WO2013/080858
PCT Pub. Date: Jun. 6, 2013

(65) Prior Publication Data
US 2015/0096286 A1 Apr. 9, 2015

(30) Foreign Application Priority Data
Nov. 28, 2011 (JP) .................. 2011-259349

(51) Int. Cl.
F01N 3/20 (2006.01)
F02B 37/00 (2006.01)
F02B 37/007 (2006.01)
F01N 13/00 (2010.01)
F01N 3/10 (2006.01)
B01D 53/90 (2006.01)
B01D 53/94 (2006.01)
F01N 13/10 (2010.01)

(52) U.S. Cl.
CPC ............ *F01N 3/206* (2013.01); *B01D 53/9477* (2013.01); *B01D 53/9495* (2013.01); *F01N3/208* (2013.01); *F01N 3/2066* (2013.01); *F01N 13/009* (2014.06); *F01N 13/0093* (2014.06); *F01N 13/011* (2014.06); *F02B 37/001* (2013.01); *F02B 37/007* (2013.01); *B01D 53/90* (2013.01); *B01D 53/9431* (2013.01); *B01D 2251/2067* (2013.01); *F01N 3/108* (2013.01); *F01N 13/107* (2013.01); *F01N 2340/02* (2013.01); *F01N 2560/06* (2013.01); *F01N 2560/14* (2013.01); *F01N 2570/14* (2013.01); *F01N 2610/02* (2013.01); *F01N 2610/146* (2013.01); *F01N 2900/1404* (2013.01); *F01N 2900/1602* (2013.01); *Y02T 10/144* (2013.01); *Y02T 10/24* (2013.01)

(58) Field of Classification Search
CPC ..... F01N 3/108; F01N 3/208; F01N 13/0093; F01N 13/011; F01N 2560/06; F01N 2560/14; F01N 2610/02; F01N 2610/146; F01N 2900/1404; F01N 2900/1602
USPC .................................. 60/286, 295, 301, 320
See application file for complete search history.

(56) References Cited

U.S. PATENT DOCUMENTS

| | | | |
|---|---|---|---|
| 2006/0080951 A1 | 4/2006 | Pott et al. | |
| 2007/0056268 A1 | 3/2007 | McCarthy, Jr. | |
| 2007/0122317 A1 | 5/2007 | Driscoll et al. | |
| 2009/0035194 A1* | 2/2009 | Robel et al. | 422/177 |
| 2010/0037599 A1 | 2/2010 | Toshioka et al. | |
| 2010/0050613 A1 | 3/2010 | Bailey | |

FOREIGN PATENT DOCUMENTS

| | | |
|---|---|---|
| JP | 2006-521482 A | 9/2006 |
| JP | 2009-517210 A | 4/2009 |
| JP | 2010-116821 A | 5/2010 |
| JP | 2010-121521 A | 6/2010 |
| JP | 2010-185434 A | 8/2010 |
| JP | 2011-021485 A | 2/2011 |
| RU | 2397337 C1 | 8/2010 |
| WO | 2004/059150 A1 | 7/2004 |
| WO | 2007/064412 A1 | 6/2007 |

OTHER PUBLICATIONS

International Preliminary Report on Patentability dated Jun. 3, 2014, issued by the International Searching Authority in counterpart application No. PCT/JP2012/080184.

Communication dated Mar. 20, 2015 from the European Patent Office in counterpart application No. 12854127.3.

Communication dated May 26, 2015 from the Russian Intellectual Property Office in counterpart application No. 2014125546/06.

\* cited by examiner

*Primary Examiner* — Thomas Denion
*Assistant Examiner* — Jorge Leon, Jr.
(74) *Attorney, Agent, or Firm* — Sughrue Mion, PLLC

(57) ABSTRACT

An exhaust gas purification device for an internal combustion engine purifies exhaust gas in a first exhaust path and a second exhaust path. The device includes a confluent path. The confluent path extends from a confluent section of the first exhaust path and the second exhaust path. A first auxiliary NOx catalyst is provided in the first exhaust path. A second auxiliary NOx catalyst is provided in the second exhaust path. A main NOx catalyst is provided in the confluent path. A first addition section adds an ammonia source in a first addition amount to a section upstream of the first auxiliary NOx catalyst to supply urea water to the first auxiliary NOx catalyst. A second addition section adds an ammonia source in a second addition amount to a section upstream of the second auxiliary NOx catalyst to supply urea water to the second auxiliary NOx catalyst.

11 Claims, 6 Drawing Sheets

EXHAUST GAS PURIFICATION DEVICE FOR INTERNAL COMBUSTION ENGINE

CROSS REFERENCE TO RELATED APPLICATIONS

This is a National Stage of International Application No. PCT/JP2012/080184 filed Nov. 21, 2012, claiming priority based on Japanese Patent Application No. 2011-259349 filed Nov. 28, 2011, the contents of all of which are incorporated herein by reference in their entirety.

FIELD OF THE INVENTION

The present invention relates to an exhaust gas purification device for an internal combustion engine that purifies exhaust gas in a first exhaust path and a second exhaust path, which extend from the internal combustion engine.

BACKGROUND OF THE INVENTION

An exhaust gas purification device that is arranged in an exhaust path of an engine and eliminates nitrogen oxide (NOx) in exhaust gas (purifies the exhaust gas) using a catalyst has conventionally been used. Patent Document 1 discloses an in-line four-cylinder engine having an exhaust path, in which a pair of NOx catalysts, i.e., a first selective reduction NOx catalyst and a second selective reduction NOx catalyst are arranged in series. A first ammonia supply system is arranged upstream of the first selective reduction NOx catalyst, which is upstream of the second selective reduction NOx catalyst, and ammonia is supplied from the first ammonia supply system to the first selective reduction NOx catalyst. Ammonia is supplied from a second ammonia supply system to between the first selective reduction NOx catalyst and the second selective reduction NOx catalyst in the exhaust path.

Patent Document 2 discloses a technical idea of making the volume of a first selective reduction NOx catalyst smaller than that of a second selective reduction NOx catalyst and thereby raising the temperature of the selective reduction NOx catalysts to a desired temperature early to improve a NOx purification rate during low-temperature running.

Some of V-engines and the like adopt a configuration including a pair of exhaust paths arranged in parallel. In this configuration, a catalyst is provided for each exhaust path.

PRIOR ART DOCUMENTS

Patent Documents

Patent Document 1: Japanese Laid-Open Patent Publication No. 2009-517210
Patent Document 2: Japanese Laid-Open Patent Publication No. 2010-121521

SUMMARY OF THE INVENTION

However, if a pair of selective reduction NOx catalysts is provided in series in a first exhaust path, and another pair of selective reduction NOx catalysts is provided in series in a second gas exhaust path, the number of necessary components, selective reduction NOx catalysts, means for supplying ammonia, and sensors required for their control is large. This configuration suffers from a cost disadvantage.

One object of the present invention is to achieve reduction in the costs of an exhaust gas purification device that purifies exhaust gas in a first exhaust path and a second exhaust path extending separately from an internal combustion engine. Another object of the present invention is to efficiently purify NOx in the exhaust gas purification device that purifies exhaust gas in the first exhaust path and the second exhaust path extending from the internal combustion engine.

To achieve the foregoing objective and in accordance with one aspect of the present invention, an exhaust gas purification device for an internal combustion engine is provided, in which the device purifies exhaust gas in a first exhaust path and a second exhaust path, which extend from the internal combustion engine. The device includes a confluent path, which extends from a confluent section of the first exhaust path and the second exhaust path, a first auxiliary NOx catalyst, which is provided in the first exhaust path, a second auxiliary NOx catalyst, which is provided in the second exhaust path, a main NOx catalyst, which is provided in the confluent path, a first addition section, which adds an ammonia source in a first addition amount to a section upstream of the first auxiliary NOx catalyst, thereby supplying urea water to the first auxiliary NOx catalyst, and a second addition section, which adds an ammonia source in a second addition amount to a section upstream of the second auxiliary NOx catalyst, thereby supplying urea water to the second auxiliary NOx catalyst.

DETAILED DESCRIPTION OF THE PREFERRED EMBODIMENTS

A first embodiment in which the present invention is applied to a diesel engine will be described below with reference to FIGS. 1 and 2.

Figure 1:
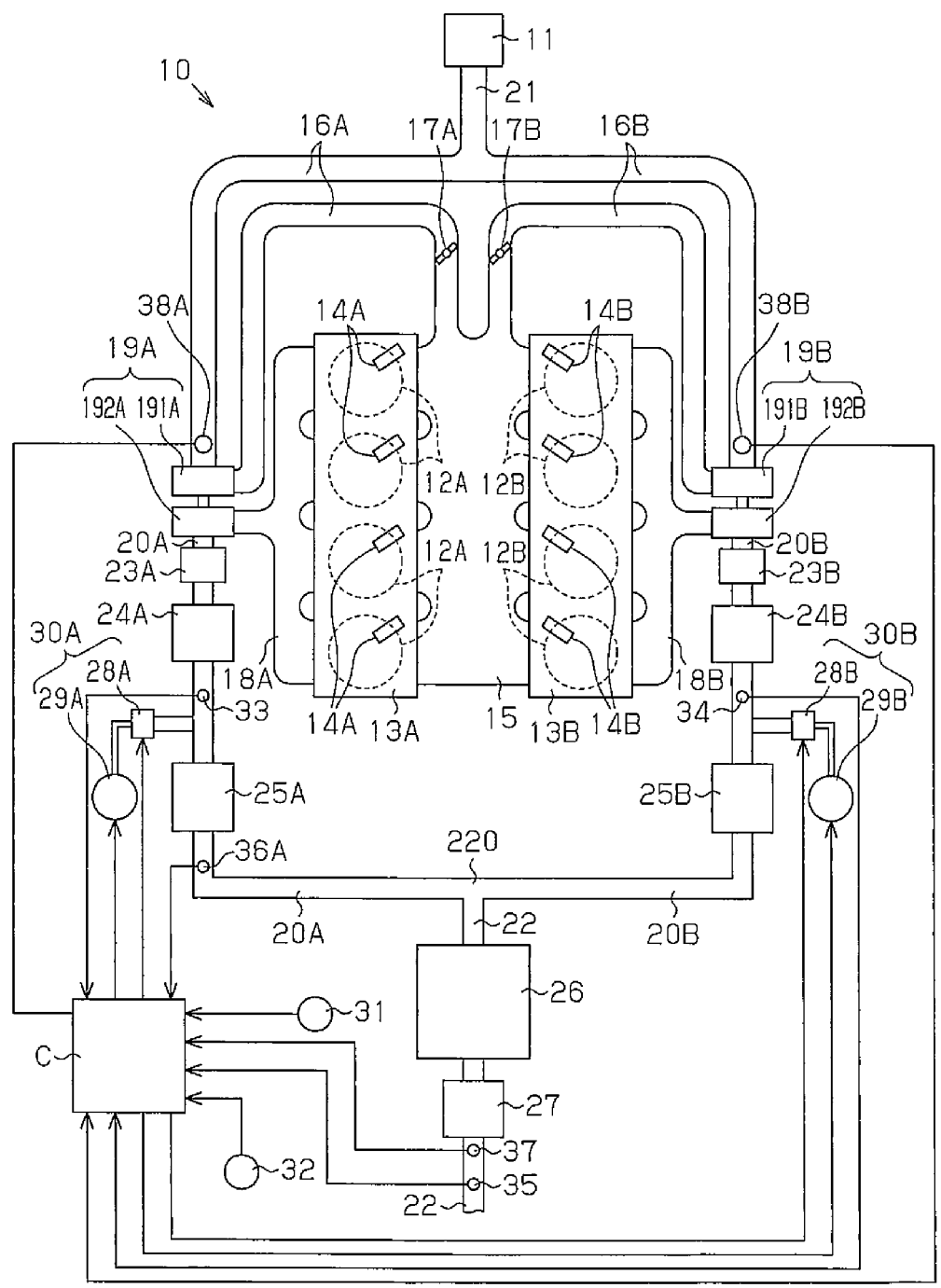
FIG. 1 is a schematic diagram showing an exhaust gas purification device according to a first embodiment of the present invention.

As shown in FIG. 1, an internal combustion engine 10, which is mounted on a vehicle, includes cylinders 12A and 12B. The cylinders 12A and 12B are divided into two groups. Fuel injection nozzles 14A are attached to a cylinder head 13A corresponding to the cylinders 12A in a first group, and fuel injection nozzles 14B are attached to a cylinder head 13B corresponding to the cylinders 12B in a second group. Each fuel injection nozzle 14A corresponds to one of the cylinders 12A, and each fuel injection nozzle 14B corresponds to one of the cylinders 12b. The fuel injection nozzles 14A and 14B inject fuel into the corresponding cylinders 12A and 12B.

An intake manifold 15 is connected to the cylinder heads 13A and 13B. The intake manifold 15 is connected to branch intake passages 16A and 16B. A compressor section 191A of a forced-induction device 19A is provided midway along the branch intake passage 16A, and a compressor section 191B of a forced-induction device 19B is provided midway along the branch intake passage 16B. The forced-induction devices 19A and 19B are known variable nozzle type turbochargers which are actuated by an exhaust gas flow.

The branch intake passages 16A and 16B are connected to a main intake passage 21. The main intake passage 21 is connected to an air cleaner 11. Throttle valves 17A and 17B are provided midway along the branch intake passages 16A and 16B, respectively, between the forced-induction devices 19A and 19B and the intake manifold 15. The throttle valves 17A and 17B adjust the flow rate of intake air, which is drawn into the branch intake passages 16A and 16B via the air cleaner 11 and the main intake passage 21.

An accelerator position (the amount by which the accelerator pedal is depressed) is detected by an accelerator position detector 31. A rotation angle of the crankshaft (not shown) (a crank angle) is detected by a crank angle detector 32. Accelerator position detection information detected by the accelerator position detector 31 and crank angle detection information detected by the crank angle detector 32 are sent to control means C as a controller. The control means C calculates a fuel injection period (an injection start time and an injection end time) for the fuel injection nozzles 14A and 14B on the basis of the accelerator position detection information and the crank angle detection information and controls fuel injection of the fuel injection nozzles 14A and 14B on the basis of the calculated fuel injection period. The control means C calculates engine speed on the basis of the crank angle detection information obtained by the crank angle detector 32.

Air drawn into the main intake passage 21 flows through the branch intake passages 16A and 16B in separate streams, and the separate streams join in the intake manifold 15. That is, intake air streams sent out from the compressor sections 191A and 191B of the forced-induction devices 19A and 19B join in the intake manifold 15 and are supplied to the cylinders 12A and 12B.

An exhaust manifold 18A is connected to the cylinder head 13A, and an exhaust manifold 18B is connected to the cylinder head 13B. Exhaust gas generated in the cylinders 12A and 12B is discharged to the exhaust manifolds 18A and 18B. A first exhaust path 20A is connected to the exhaust manifold 18A via a turbine section 192A of the forced-induction device 19A. A second exhaust path 20B is connected to the exhaust manifold 18B via a turbine section 192B of the forced-induction device 19B. The first exhaust path 20A and the second exhaust path 20B extend separately from the internal combustion engine and are connected to a confluent path 22 at a confluent section 220.

In the first exhaust path 20A, a first oxidation catalyst 23A, a first diesel particulate reactor (DPR) catalyst 24A, and a first auxiliary selective reduction NOx catalyst 25A as a first auxiliary NOx catalyst are provided in series in this order from the upstream side toward the downstream side. In the second exhaust path 20B, a second oxidation catalyst 23B, a second DPR catalyst 24B, and a second auxiliary selective reduction NOx catalyst 25B as a second auxiliary NOx catalyst are provided in series in this order. The oxidation catalysts 23A and 23B function to purify exhaust gas by oxidizing unburned components [e.g., a hydrocarbon (HC)] in the exhaust gas. The DPR catalysts 24A and 24B function to eliminate particulate matter (PM) from exhaust gas by collecting and burning the particulate matter in the exhaust gas. The auxiliary selective reduction NOx catalysts 25A and 25B function to purify exhaust gas by reducing NOx in the exhaust gas. The volume of the first auxiliary selective reduction NOx catalyst 25A is equal to that of the second auxiliary selective reduction NOx catalyst 25B.

A first addition valve 28A is connected to the first exhaust path 20A at a section that is upstream of the first auxiliary selective reduction NOx catalyst 25A and downstream of the first DPR catalyst 24A. The first addition valve 28A is connected to a first pump 29A. The first pump 29A supplies urea water (an ammonia source) to the first addition valve 28A. A second addition valve 28B is connected to the second exhaust path 20B at a section that is upstream of the second auxiliary selective reduction NOx catalyst 25B and downstream of the second DPR catalyst 24B. The second addition valve 28B is connected to a second pump 29B. The second pump 29B supplies urea water (an ammonia source) to the second addition valve 28B.

The control means C controls the activation of the addition valves 28A and 28B and the pumps 29A and 29B. The first pump 29A and the first addition valve 28A form first addition means 30A as a first addition section, which supplies urea water (an ammonia source) to the first auxiliary selective reduction NOx catalyst 25A. The second pump 29B and the second addition valve 28B form second addition means 30B as a second addition section, which supplies urea water (an ammonia source) to the second auxiliary selective reduction NOx catalyst 25B.

A first NOx sensor 33 is provided between the first DPR catalyst 24A and the first addition valve 28A in the first exhaust path 20A. The first NOx sensor 33 detects the concentration of NOx in exhaust gas between the first DPR catalyst 24A and the first addition valve 28A in the first exhaust path 20A. A second NOx sensor 34 is provided between the second DPR catalyst 24B and the second addition valve 28B in the second exhaust path 20B. The second NOx sensor 34 detects the concentration of NOx in exhaust gas between the second DPR catalyst 24B and the second addition valve 28B in the second exhaust path 20B.

A main selective reduction NOx catalyst 26 and an ammonia catalyst 27 are provided in series in this order from the upstream side toward the downstream side in the confluent path 22, which is downstream of the confluent section 220 of the first exhaust path 20A and the second exhaust path 20B. The main selective reduction NOx catalyst 26 functions to purify exhaust gas by reducing NOx in the exhaust gas. The volume of the main selective reduction NOx catalyst 26 is larger than those of the auxiliary selective reduction NOx catalysts 25A and 25B. The ammonia catalyst 27 functions to purify exhaust gas by oxidizing ammonia.

In the present embodiment, selective reduction NOx catalysts having high high-temperature purification rates are used as the auxiliary selective reduction NOx catalysts 25A and 25B, and a selective reduction NOx catalyst having a high low-temperature purification rate is used as the main selective reduction NOx catalyst 26.

A third NOx sensor 35 is provided downstream of the ammonia catalyst 27. The third NOx sensor 35 detects the concentration of NOx in exhaust gas downstream of the ammonia catalyst 27 in the confluent path 22.

A temperature sensor 36A is provided downstream of the first auxiliary selective reduction NOx catalyst 25A in the first exhaust path 20A. The temperature sensor 36A is a first temperature detector, which detects the temperature of the first auxiliary selective reduction NOx catalyst 25A by detecting exhaust gas temperature downstream of the first auxiliary selective reduction NOx catalyst 25A in the first exhaust path 20A.

A temperature sensor 37 is provided downstream of the ammonia catalyst 27. The temperature sensor 37 is a third temperature detector which detects the temperature of the main selective reduction NOx catalyst 26 by detecting exhaust gas temperature downstream of the ammonia catalyst 27 in the confluent path 22.

Information on the exhaust gas temperatures detected by the temperature sensors 36A and 37 and information on the NOx concentrations detected by the NOx sensors 33, 34, and 35 are sent to the control means C. The control means C calculates a urea water addition amount in the first addition valve 28A (hereinafter simply referred to as an addition amount) as a first addition amount on the basis of the detected NOx concentration obtained from the first NOx sensor 33 and a detected flow rate of intake air obtained from an air flow meter 38A. The control means C then instructs the first addition valve 28A to add urea water in the calculated addition amount to supply urea water to the first auxiliary selective reduction NOx catalyst 25A. The control that adds urea water in a calculated addition amount is normal addition control for the first addition valve 28A. The control means C also calculates a urea water addition amount in the second addition valve 28B as a second addition amount on the basis of the detected NOx concentration obtained from the second NOx sensor 34 and a detected flow rate of intake air obtained from an air flow meter 38B. The control means C then instructs the second addition valve 28B to add urea water in the calculated addition amount to supply urea water to the second auxiliary selective reduction NOx catalyst 25B. The control that adds urea water in a calculated addition amount is normal addition control for the second addition valve 28B.

That is, normal addition control refers to control that adds urea water in an addition amount corresponding to the flow rate of NOx, which can be acquired from a NOx concentration, the flow rate of intake air, and the like.

Figure 2:
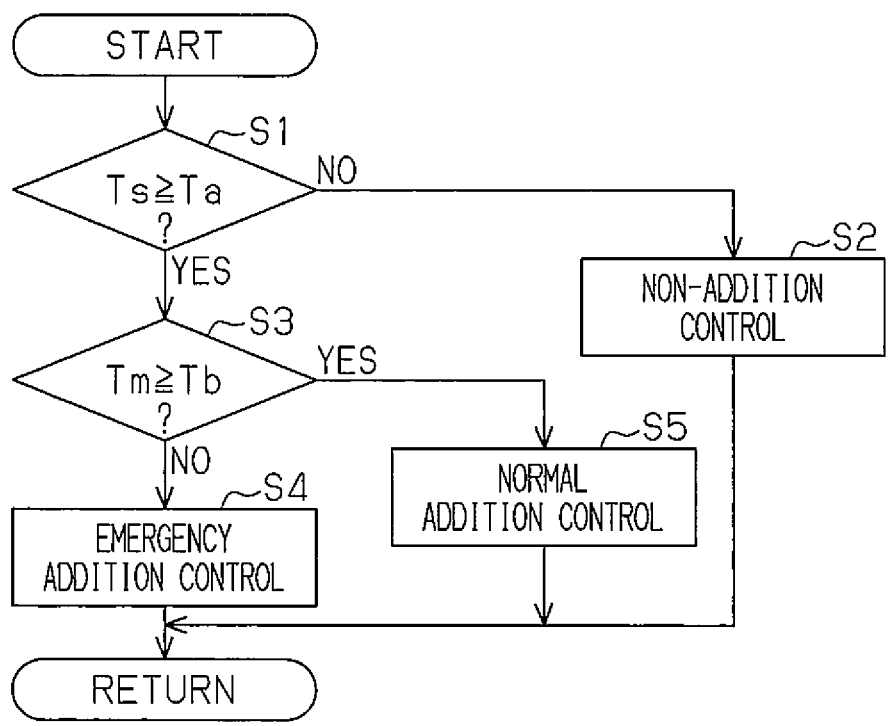
FIG. 2 is a flowchart showing an addition control program according to the first embodiment.

The control means C controls addition of urea water on the basis of an addition control program shown by a flowchart in FIG. 2.

Operation of the first embodiment and the addition control will be described with reference to the flowchart in FIG. 2.

When the engine is started up, the control means C compares a detected temperature Ts, which is obtained by the temperature sensor 36A, with a first reference temperature Ta, which is set in advance (step S1). In the present embodiment, the first reference temperature Ta is the decomposition temperature of urea. Urea is decomposed to produce ammonia. If the detected temperature Ts is less than the first reference temperature Ta (NO in step S1), the control means C selects non-addition control, in which addition of urea water from the addition valves 28A and 28B is not performed (step S2).

On the other hand, if the detected temperature Ts is higher than or equal to the first reference temperature Ta (YES in step S1), the control means C compares a detected temperature Tm, which is obtained by the temperature sensor 37, with a second reference temperature Tb, which is set in advance (the activation temperature of the main selective reduction NOx catalyst 26 in the present embodiment) (step S3). If the detected temperature Tm is less than the second reference temperature Tb (NO in step S3), the control means C selects emergency addition control (step S4).

In the emergency addition control, the addition amount from the first addition valve 28A is increased, and the addition amount from the second addition valve 28B is reduced. In the present embodiment, the addition amount from the first addition valve 28A in the emergency addition control (a first changed addition amount) is the sum of the normal addition amount in the first addition valve 28A (i.e., a urea water addition amount in the normal addition control) and the normal addition amount in the second addition valve 28B. The addition amount from the second addition valve 28B in the emergency addition control (a second changed addition amount) is 0.

The emergency addition control is selected (executed) when the temperature of exhaust gas is low (e.g., during start-up of the engine). Control that changes the addition amount from the second addition valve 28B to 0 raises the temperature of the second auxiliary selective reduction NOx catalyst 25B, which in turn leads to an early increase in the temperature of the main selective reduction NOx catalyst 26. This improves a NOx purification rate in the main selective reduction NOx catalyst 26.

Urea water added from the first addition valve 28A is converted into ammonia in the first auxiliary selective reduction NOx catalyst 25A and in the first exhaust path 20A downstream of the first auxiliary selective reduction NOx catalyst 25A. When the temperature of exhaust gas is low, a rate of NOx purification by ammonia in the main selective reduction NOx catalyst 26 is higher than the rate of NOx purification by urea water. That is, the process of adding as much urea water as necessary to reduce NOx upstream of the first auxiliary selective reduction NOx catalyst 25A (the control that increases the addition amount from the first addition valve 28A) has advantage over the process of adding urea water between the main selective reduction NOx catalyst 26 and the first auxiliary selective reduction NOx catalyst 25A (i.e., adding urea water downstream of the first auxiliary selective reduction NOx catalyst 25A) in improving the NOx purification rate in the main selective reduction NOx catalyst 26.

On the other hand, if the detected temperature Tm is higher than or equal to the second reference temperature Tb (YES in step S3), the control means C selects the normal addition control described earlier (step S5).

The first embodiment achieves the advantages below.

(1) The first exhaust path 20A and the second exhaust path 20B extend separately from the internal combustion engine 10, and their distal ends are connected to the confluent path 22 at the confluent section 220. For this reason, only one main selective reduction NOx catalyst 26 is required to be provided downstream of the first auxiliary selective reduction NOx catalyst 25A provided in the first exhaust path 20A and the second auxiliary selective reduction NOx catalyst 25B provided in the second exhaust path 20B to correspond to the first auxiliary selective reduction NOx catalyst 25A and the second auxiliary selective reduction NOx catalyst 25B. This results in reduction in the costs of the exhaust gas purification device when the first exhaust path 20A and the second exhaust path 20B extend separately from the internal combustion engine 10.

(2) When the emergency addition control is performed, a urea water addition amount to the first auxiliary selective reduction NOx catalyst 25A is increased, and a urea water addition amount to the second auxiliary selective reduction NOx catalyst 25B is reduced to 0. This hastens a temperature increase in the second auxiliary selective reduction NOx catalyst 25B, the urea water supply amount to which is 0, and a temperature increase in the main selective reduction NOx catalyst 26. As a result, the NOx purification rate in the main selective reduction NOx catalyst 26 when the temperature of exhaust gas is low is improved.

(3) The NOx purification efficiency of ammonia at low temperatures is higher than that of urea water. Thus, during cold transient operation (e.g., during start-up), ammonia passing through the first auxiliary selective reduction NOx catalyst 25A without reaction exhibits high NOx purification performance in the main selective reduction NOx catalyst 26.

The larger the distance between the second auxiliary selective reduction NOx catalyst 25B and the main selective reduction NOx catalyst 26, i.e., the longer the exhaust path from the second auxiliary selective reduction NOx catalyst 25B to the main selective reduction NOx catalyst 26, the more promoted conversion from urea water into ammonia becomes. This contributes to improvement of NOx purification efficiency in the main selective reduction NOx catalyst 26. Additionally, since a selective reduction NOx catalyst having a high low-temperature purification rate is used as the main selective reduction NOx catalyst 26, NOx having passed through the auxiliary selective reduction NOx catalysts 25A and 25B can be efficiently purified in the main selective reduction NOx catalyst 26 at low temperatures (e.g., during the non-addition control and during the emergency addition control). In addition, since the auxiliary selective reduction NOx catalysts 25A and 25B arranged on the upstream side have high high-temperature purification rates, and the main selective reduction NOx catalyst 26 arranged on the downstream side with a lower exhaust gas temperature has a high low-temperature purification rate, NOx can be efficiently purified even under operation conditions with a high exhaust temperature.

(4) In the emergency addition control, the urea water addition amount in the first addition valve 28A is the sum of the urea water addition amount in the first addition valve 28A and the urea water addition amount in the second addition valve 28B in the normal addition control. Thus, the urea water addition amount required to purify NOx is ensured.

(5) The volumes of the auxiliary selective reduction NOx catalysts 25A and 25B are smaller than that of the main selective reduction NOx catalyst 26. This contributes to shortening of the warm-up time period in the second auxiliary selective reduction NOx catalyst 25B. The shortening hastens the urea water addition start time after start-up of the internal combustion engine 10 and improves the NOx purification rate in an early stage of the start-up of the internal combustion engine 10.

(6) Ammonia may pass through the main selective reduction NOx catalyst 26. The ammonia catalyst 27 purifies exhaust gas by oxidizing ammonia having passed through the main selective reduction NOx catalyst 26. For this reason, ammonia is not emitted to the atmosphere.

(7) Detected information obtained by the third NOx sensor 35 is compared with detected information obtained by the NOx sensors 33 and 34. The result of the comparison can be used to acquire the amount of ammonia passing through the main selective reduction NOx catalyst 26. If the amount of ammonia passing though the main selective reduction NOx catalyst 26 is large, the urea water addition amount may be abnormally larger than a proper addition amount. A possible cause of the abnormality is a failure in the addition means 30A or 30B. That is, the third NOx sensor 35 can be used to determine the presence or absence of a failure in the addition means 30A or 30B.

A second embodiment will be described with reference to FIGS. 3 and 4. The same components as those in the first embodiment are denoted by the same reference numerals, and a detailed description of the components will be omitted.

Figure 3:
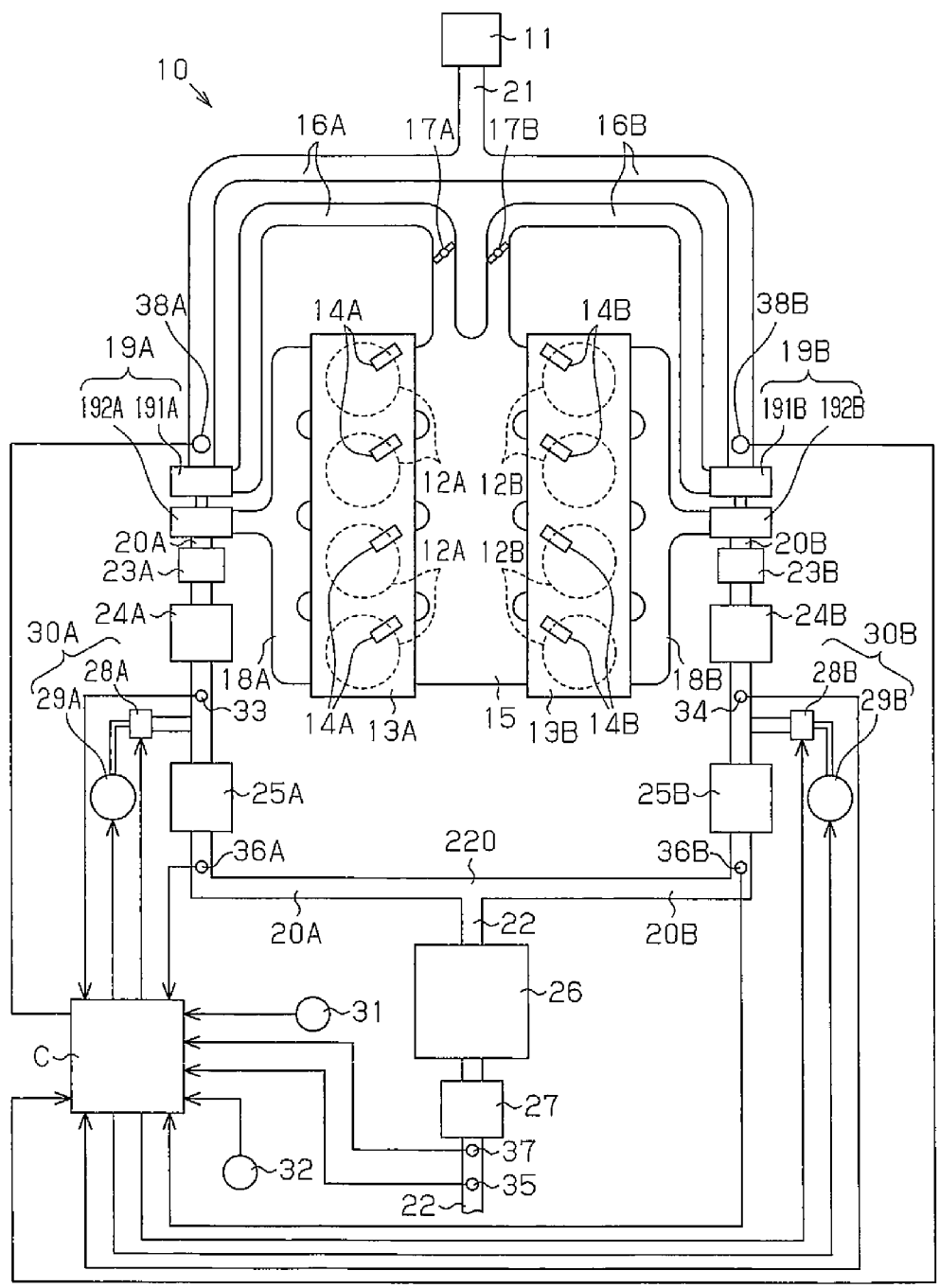
FIG. 3 is a schematic diagram showing an exhaust gas purification device according to a second embodiment of the present invention.

As shown in FIG. 3, a temperature sensor 36B is provided downstream of a second auxiliary selective reduction NOx catalyst 25B in a second exhaust path 20B. The temperature sensor 36B is a second temperature detector, which detects the temperature of the second auxiliary selective reduction NOx catalyst 25B by detecting exhaust gas temperature downstream of the second auxiliary selective reduction NOx catalyst 25B in the second exhaust path 20B.

Figure 4:
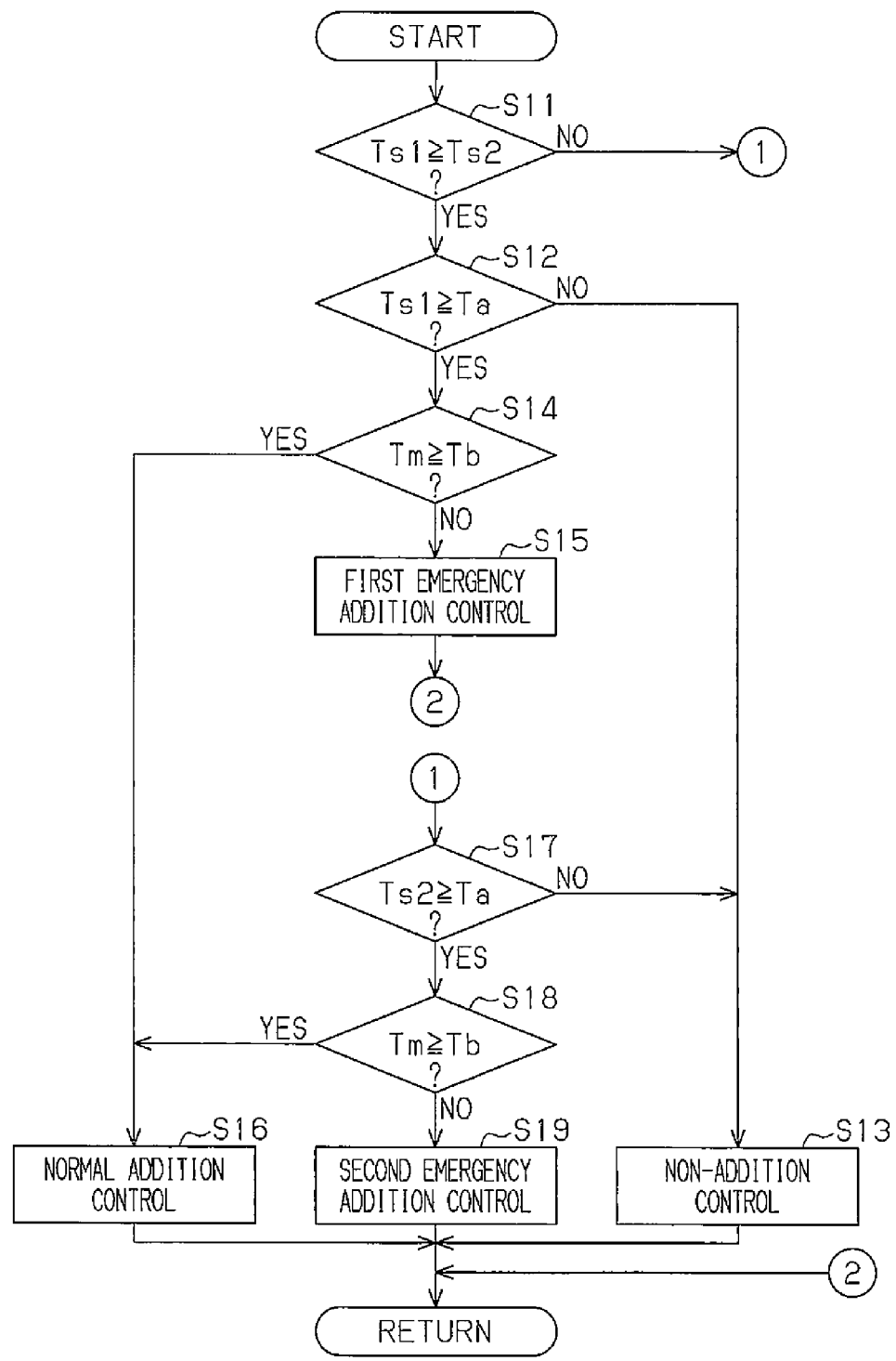
FIG. 4 is a flowchart showing an addition control program according to the second embodiment.

Control means C controls addition of urea water on the basis of an addition control program shown by a flowchart in FIG. 4.

Addition control in the second embodiment will be described with reference to the flowchart in FIG. 4.

When the engine is started up, the control means C compares a detected temperature Ts1, which is obtained by a temperature sensor 36A, with a detected temperature Ts2, which is obtained by the temperature sensor 36B (step S11). If the detected temperature Ts1 is higher than or equal to the detected temperature Ts2 (YES in step S11), the control means C compares the detected temperature Ts1 with a first reference temperature Ta, which is set in advance (step S12). If the detected temperature Ts1 is less than the first reference temperature Ta (NO in step S12), the control means C selects non-addition control, in which addition of urea water from addition valves 28A and 28B is not performed (step S13).

On the other hand, if the detected temperature Ts1 is higher than or equal to the first reference temperature Ta (YES in step S12), the control means C compares a detected temperature Tm, which is obtained by a temperature sensor 37, with a second reference temperature Tb, which is set in advance (step S14). If the detected temperature Tm is less than the second reference temperature Tb (NO in step S14), the control means C selects first emergency addition control (step S15).

In the first emergency addition control, the addition amount from the first addition valve 28A is increased, and the addition amount from the second addition valve 28B is reduced. In the present embodiment, the addition amount from the first addition valve 28A in the first emergency addition control is the sum of the normal addition amount in the first addition valve 28A and the normal addition amount in the second addition valve 28B. The addition amount from the second addition valve 28B in the first emergency addition control is 0.

On the other hand, if the detected temperature Tm is higher than or equal to the second reference temperature Tb (YES in step S14), the control means C selects the normal addition control described earlier (step S16).

If the determination result in step S11 is NO (the detected temperature Ts2 is higher than the detected temperature Ts1), the control means C compares the detected temperature Ts2 with the first reference temperature Ta set in advance (step S17). If the detected temperature Ts2 is less than the first reference temperature Ta (NO in step S17), the control means C selects the non-addition control, in which addition of urea water from the addition valves 28A and 28B is not performed (step S13).

On the other hand, if the detected temperature Ts2 is higher than or equal to the first reference temperature Ta (YES in step S17), the control means C compares the detected temperature Tm obtained by the temperature sensor 37 with the second reference temperature Tb set in advance (step S18). If the detected temperature Tm is less than the second reference temperature Tb (NO in step S18), the control means C selects second emergency addition control (step S19).

In the second emergency addition control, the addition amount from the second addition valve 28B is increased, and the addition amount from the first addition valve 28A is reduced. In the present embodiment, the addition amount from the second addition valve 28B in the second emergency addition control is the sum of the normal addition amount in the second addition valve 28B and the normal addition amount in the first addition valve 28A. The addition amount from the first addition valve 28A in the second emergency addition control is 0.

The control means C functions to select one the first emergency addition control and the second emergency addition control on the basis of comparison among the detected temperature Ts1 detected by the temperature sensor 36A, the detected temperature Ts2 detected by the temperature sensor 36B, and the first reference temperature Ta.

On the other hand, if the detected temperature Tm is higher than or equal to the second reference temperature Tb (YES in step S18), the control means C selects the normal addition control described earlier (step S16).

The second embodiment achieves the advantages below in addition to the same advantages as those in the first embodiment.

In the first embodiment, the exhaust gas temperatures downstream of the two auxiliary selective reduction NOx catalysts 25A and 25B are assumed to be equal to each other, and only the exhaust gas temperature downstream of one (the first auxiliary selective reduction NOx catalyst 25A) of the auxiliary selective reduction NOx catalysts 25A and 25B is detected. In contrast, in the second embodiment, the exhaust gas temperatures downstream of the two auxiliary selective reduction NOx catalysts 25A and 25B are assumed to be sometimes different from each other, and the exhaust gas temperatures downstream of the two auxiliary selective reduction NOx catalysts 25A and 25B are detected. Reasons why the exhaust gas temperatures downstream of the two auxiliary selective reduction NOx catalysts 25A and 25B are different include the operation state of the internal combustion engine 10 and the difference between individual temperature increases in the two auxiliary selective reduction NOx catalysts 25A and 25B.

Detection of the exhaust gas temperatures downstream of the two auxiliary selective reduction NOx catalysts 25A and 25B as in the second embodiment allows identification of one of the auxiliary selective reduction NOx catalysts (25A and 25B) the temperature of which increases rises earlier. Emergency addition control can thus be started earlier to shorten the non-addition control time period. This results in early start of the NOx purification.

Figure 5:
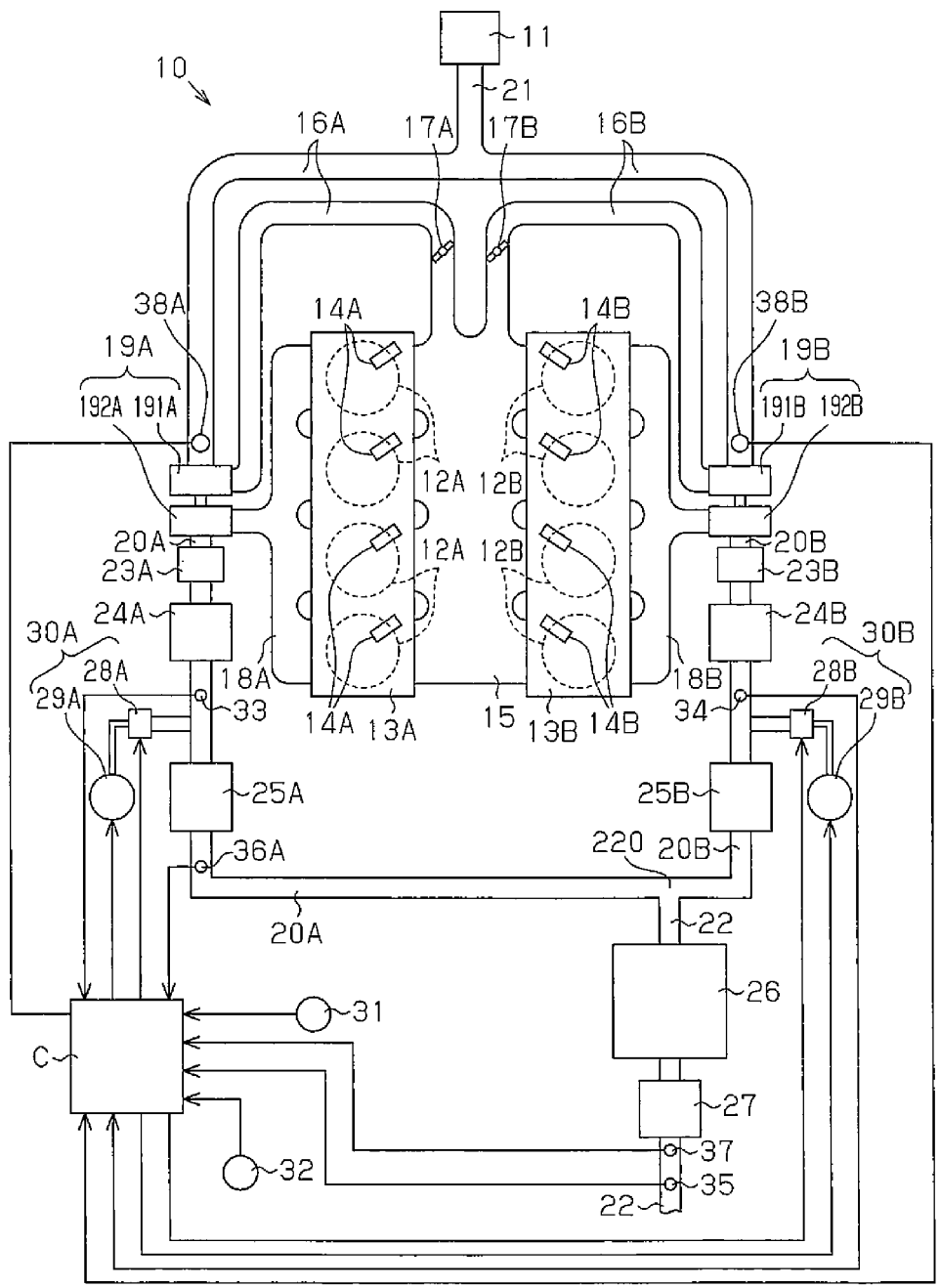
FIG. 5 is a schematic diagram showing an exhaust gas purification device according to a third embodiment of the present invention.

A third embodiment will be described with reference to FIG. 5. The same components as those in the first embodiment are denoted by the same reference numerals, and a detailed description of the components will be omitted.

An addition control program according to the third embodiment is the same as that in the first embodiment. At the time of emergency addition control, the addition amount from a first addition valve 28A is increased, and the addition amount from a second addition valve 28B is changed to 0. The length of the portion from a first auxiliary selective reduction NOx catalyst 25A to a confluent path 22 of a first exhaust path 20A is larger than that of the portion from a second auxiliary selective reduction NOx catalyst 25B to the confluent path 22 of a second exhaust path 20B. That is, the exhaust path from the second auxiliary selective reduction NOx catalyst 25B, to which the addition amount in the emergency addition control is 0, to a main selective reduction NOx catalyst 26 is shorter than the exhaust path from the first auxiliary selective reduction NOx catalyst 25A, to which an addition amount in the emergency addition control is not 0, to the main selective reduction NOx catalyst 26.

In the third embodiment, since the exhaust path from the second auxiliary selective reduction NOx catalyst 25B, to which the addition amount in the emergency addition control is 0, to the main selective reduction NOx catalyst 26 is short, which has the advantage of an earlier temperature increase in the main selective reduction NOx catalyst 26 at the time of the emergency addition control. Since the exhaust path from the first auxiliary selective reduction NOx catalyst 25A, to which the addition amount in the emergency addition control is not 0, to the main selective reduction NOx catalyst 26 is long, the time period required to travel from the first auxiliary selective reduction NOx catalyst 25A to the main selective reduction NOx catalyst 26 is long. For this reason, the amount of ammonia into which urea is converted midway between the first auxiliary selective reduction NOx catalyst 25A and the main selective reduction NOx catalyst 26 is larger. Thus, NOx purification efficiency can be improved.

In the present invention, the embodiments below are also possible.

Figure 6:
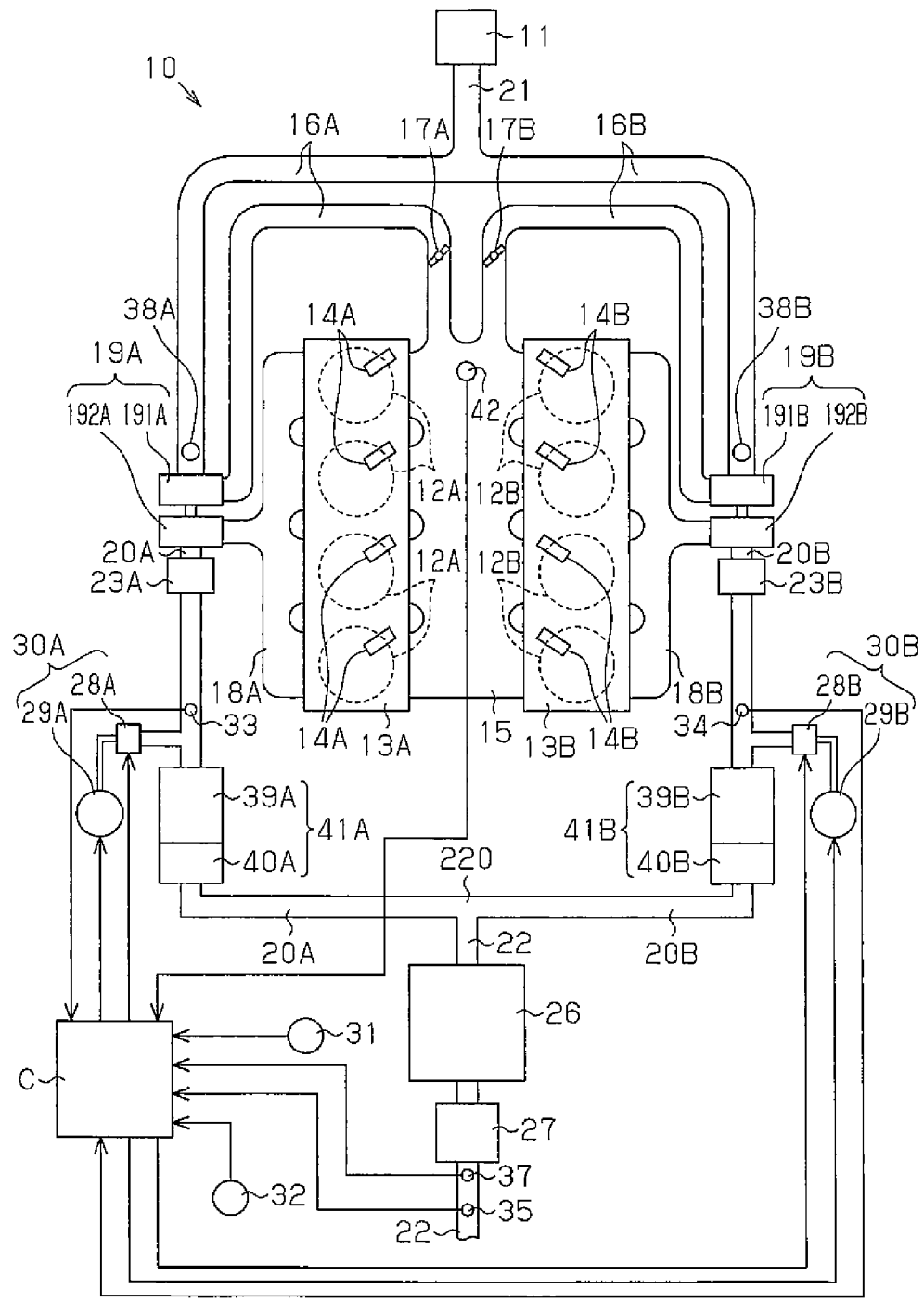
FIG. 6 is a schematic diagram showing an exhaust gas purification device according to another embodiment.

As in another embodiment shown in FIG. 6, a combined catalyst 41A into which a DPR catalyst 39A and a selective reduction NOx catalyst 40A are combined and a combined catalyst 41B into which a DPR catalyst 39B and a selective reduction NOx catalyst 40B are combined may be used instead of the auxiliary selective reduction NOx catalysts 25A and 25B. In this case, addition valves 28A and 28B may add urea water to a section upstream of the combined catalysts 41A and 41B. The adoption of the combined catalysts 41A and 41B has cost advantage.

As shown in FIG. 6, the amount of NOx emissions, which is estimated from intake air flow rate information obtained from air flow meters 38A and 38B, forced-induction pressure information obtained by a pressure detector 42 in an intake manifold 15, RPM information, and the like may be used for addition control. Estimation of the amount of NOx emissions is disclosed in, for example, Japanese Laid-Open Patent Publications No. 2010-270664 and 2005-139983. Control means C controls the degrees of opening of vanes in turbine sections 192A and 192B of forced-induction devices 19A and 19B on the basis of the forced-induction pressure information detected by the pressure detector 42 such that the actual forced-induction pressure matches with target forced-induction pressure.

A NOx storage reduction catalyst or a DPNR catalyst (diesel particulate NOx reduction carrying a storage reduction NOx catalyst) may be used instead of the auxiliary selective reduction NOx catalysts 25A and 25B, and fuel (diesel oil) may be added instead of urea water. In this case, an oxidation catalyst that oxidizes fuel having passed through the main selective reduction NOx catalyst 26 is arranged downstream of the main selective reduction NOx catalyst 26, instead of the ammonia catalyst 27.

A combination of selective reduction NOx catalysts having high low-temperature purification rates as the auxiliary selective reduction NOx catalysts 25A and 25B and a selective reduction NOx catalyst having a high high-temperature purification rate as the main selective reduction NOx catalyst 26 may be used. In this case, by setting the first reference temperature to be set in advance to be low, the period for non-addition control can be shortened, and NOx purification efficiency can be improved.

It is possible to employ a combination of a selective reduction NOx catalyst having a high low-temperature purification rate as the first auxiliary selective reduction NOx catalyst 25A, a selective reduction NOx catalyst having a high medium-temperature purification rate as the second auxiliary selective reduction NOx catalyst 25B, and a selective reduction NOx catalyst having a high high-temperature purification rate as the main selective reduction NOx catalyst 26. In this case, by setting the first reference temperature to be set in advance to be low, the period for non-addition control can be shortened, and the NOx purification rate in the second auxiliary selective reduction NOx catalyst 25B at the time of normal addition control can be improved. This allows reduction in the amount of NOx flowing into the main selective reduction NOx catalyst.

In the first embodiment, the addition amount to the second auxiliary selective reduction NOx catalyst 25B may be reduced to an addition amount other than 0 in the emergency addition control.

In the first embodiment, the urea water addition amount to the first auxiliary selective reduction NOx catalyst 25A may be reduced and the urea water addition amount to the second auxiliary selective reduction NOx catalyst 25B may be increased, in the emergency addition control.

In the first embodiment, a temperature detector that detects exhaust gas temperature in the second exhaust path 20B may be provided, and the average value of the detected temperature obtained from the temperature detector and the detected temperature obtained from the temperature sensor 36A may be used as the temperature Ts in step S1 of the flowchart in FIG. 2. Alternatively, a lower one of the detected temperature obtained from the temperature detector and the detected temperature obtained from the temperature sensor 36A may be used as the temperature Ts.

As the first reference temperature, a temperature that is higher than the decomposition temperature of urea and is lower than the activation temperature in the main selective reduction NOx catalyst 26 may be adopted.

As the second reference temperature, a temperature that is higher than the activation temperature in the main selective reduction NOx catalyst 26 may be adopted.

In the urea water addition control in the control means C, the amounts of ammonia adsorbed in the main selective reduction NOx catalyst 26 and the auxiliary selective reduction NOx catalysts 25A and 25B and the amount of NOx discharged from the internal combustion engine 10 may be calculated, and addition of urea water may be suspended according to the amounts of ammonia that can be adsorbed in the selective reduction NOx catalysts.

The present invention may be applied to a gasoline engine.

The invention claimed is:

1. An exhaust gas purification device for an internal combustion engine, wherein the device purifies exhaust gas in a first exhaust path and a second exhaust path, which extend from the internal combustion engine, the device comprising:
   a confluent path, which extends from a confluent section of the first exhaust path and the second exhaust path;
   a first auxiliary NOx catalyst, which is provided in the first exhaust path;
   a second auxiliary NOx catalyst, which is provided in the second exhaust path;
   a main NOx catalyst, which is provided in the confluent path;
   a first addition section, which adds an ammonia source in a first addition amount to a section upstream of the first auxiliary NOx catalyst, thereby supplying urea water to the first auxiliary NOx catalyst; and
   a second addition section, which adds an ammonia source in a second addition amount to a section upstream of the second auxiliary NOx catalyst, thereby supplying urea water to the second auxiliary NOx catalyst;
   a first temperature detector, which detects a temperature of the first auxiliary NOx catalyst; and
   a controller, which controls the first addition amount and the second addition amount, wherein the controller is configured to
   compare the temperature detected by the first temperature detector with a first reference temperature set in advance, and
   execute, on the basis of the comparison, emergency addition control to increase one of the first addition amount and the second addition amount to a first changed addition amount and reduce the other to a second changed addition amount.

2. The exhaust gas purification device for an internal combustion engine according to claim 1, further comprising:
   a second temperature detector, which detects a temperature of the second auxiliary NOx catalyst,
   wherein the controller is configured to
   compare the temperature detected by the first temperature detector, the temperature detected by the second temperature detector, and the first reference temperature with one another, and
   execute, on the basis of the comparison, the emergency addition control.

3. The exhaust gas purification device for an internal combustion engine according to claim 2, wherein
   the controller is configured to execute the emergency addition control if a higher temperature value of the temperature detected by the first temperature detector and the temperature detected by the second temperature detector is higher than or equal to the first reference temperature, and
   the first and second addition amounts are changed in the emergency addition control such that an addition amount to the higher temperature value is increased and an addition amount to a lower temperature value of the temperature detected by the first temperature detector and the temperature detected by the second temperature detector is reduced.

4. The exhaust gas purification device for an internal combustion engine according to claim 2, wherein the controller is configured to execute non-addition control that changes the first addition amount and the second addition amount to 0 if the temperature detected by the first temperature detector and the temperature detected by the second temperature detector are less than the first reference temperature.

5. The exhaust gas purification device for an internal combustion engine according to claim 1, wherein the second changed addition amount in the emergency addition control is 0.

6. The exhaust gas purification device for an internal combustion engine according to claim 1, wherein the first changed addition amount in the emergency addition control is a sum of the first addition amount and the second addition amount in normal addition control.

7. The exhaust gas purification device for an internal combustion engine according to claim 1, wherein the controller is configured to execute the emergency addition control if the temperature detected by the first temperature detector is higher than or equal to the first reference temperature.

8. The exhaust gas purification device for an internal combustion engine according to claim 1, wherein the controller is configured to execute non-addition control that changes an addition amount in the first addition section and an addition amount in the second addition section to 0 if the temperature detected by the first temperature detector is less than the first reference temperature.

9. The exhaust gas purification device for an internal combustion engine according to claim 1, further comprising a third temperature detector, which detects a temperature of the main NOx catalyst,
   wherein the controller is configured to
   compare the temperature detected by the third temperature detector with a second reference temperature set in advance, and execute, on the basis of the comparison, normal addition control that controls the first and second addition amounts to normal addition amounts.

10. The exhaust gas purification device for an internal combustion engine according to claim 1, wherein the main NOx catalyst, the first auxiliary NOx, and the second auxiliary NOx are all selective reduction NOx catalysts.

11. The exhaust gas purification device for an internal combustion engine according to claim 1, wherein a length of the second exhaust path is shorter than a length of the first exhaust path, and the controller increases the first addition amount and reduces the second addition amount in the emergency addition control.

* * * * *